(12) United States Patent
Connolly (10) Patent No.: US 6,762,830 B1
(45) Date of Patent: Jul. 13, 2004

(54) LASER LEVEL ASSEMBLY (76) Inventor: Michael Connolly, 52 Hughes St., Mile End. South Australia 5031 (AU)

( * ) Notice: Subject to any disclaimer, the term of this patent is extended or adjusted under 35 U.S.C. 154(b) by 0 days.

(21) Appl. No.: 09/786,424
(22) PCT Filed: Sep. 2, 1999
(86) PCT No.: PCT/AU99/00714
§ 371 (c)(1), (2), (4) Date: Mar. 2, 2001
(87) PCT Pub. No.: WO00/14480
PCT Pub. Date: Mar. 16, 2000

(30) Foreign Application Priority Data

Sep. 2, 1998 (AU) .............................................. PP5613

(51) Int. Cl.⁷ .............................................. G01B 11/26
(52) U.S. Cl. ...................................................... 356/138
(58) Field of Search ........................... 356/138, 139.07, 356/139.1, 141.1, 408, 137.1

(56) References Cited

U.S. PATENT DOCUMENTS

| 4,973,158 A | | 11/1990 | Marsh | |
|---|---|---|---|---|
| 4,988,192 A | | 1/1991 | Knittel | |
| 5,331,395 A | | 7/1994 | Piske et al. | |
| 5,742,387 A | | 4/1998 | Ammann | |
| 5,754,582 A | * | 5/1998 | Dong | ......................... 372/107 |
| 5,893,215 A | * | 4/1999 | Kumagai et al. | ......... 33/366.16 |
| 5,898,490 A | * | 4/1999 | Ohtomo et al. | ........... 356/141.3 |
| 6,011,613 A | * | 1/2000 | Ohtomo et al. | ............. 356/4.08 |

FOREIGN PATENT DOCUMENTS

| DE | 4406914 A1 | 9/1975 |
|---|---|---|
| DE | 19637812 A1 | 3/1998 |

* cited by examiner

Primary Examiner—Michael P. Stafira
(74) Attorney, Agent, or Firm—R. Neil Sudol; Henry D. Coleman; William J. Sapone (57) ABSTRACT Disclosed is a laser surveying apparatus including a body, a platform pivotally supported by the body about a first axis, a drive pivotally supported by the platform about a second axis transverse to the first axis, a head rotatably supported by the drive to rotate about a third axis transverse to the second axis, and a semiconductor laser supported by the head to project laser radiation transverse the third axis. Electrical power to the laser is supplied via rotatable connections thereby allowing the weight of a power source to be omitted from the rotating head. Selective adjustments of the head allow the laser to rotate in a horizontal plane, a vertical plane or an inclined plane. Selective adjustment of the platform permits the laser to irradiate in a vertical plane at differing horizontal angles so facilitating marking out of buildings, fences etc. In one form the laser may be used as a plumb line and shine through the platform and body down upon a style thereby facilitating accurate location of the apparatus. The laser and drive in one form are remotely controlled to effect rotation, on/off of the laser, and dither action of the laser.

27 Claims, 12 Drawing Sheets

LASER LEVEL ASSEMBLY

FIELD OF THE INVENTION

The invention disclosed herein relates to a laser level assembly. The laser level assembly is an apparatus that provides a laser beam which can be used for applications including but not limited to surveying and construction levelling and marking out.

BACKGROUND OF THE INVENTION

The use of a rotating laser beam to define a plane is well known. These devices have typically incorporated a semiconductor laser fixed within a housing projecting its laser light beam into a spinning prism which effects translation of a typically vertically projected beam into a rotating horizontal beam. Attachments have been available which in like manner effect a rotating vertical laser beam, however these require the dismantling of a set up device to permit fitting. Therefore the device must be relocated and reset when changing from a horizontal rotating laser beam to a vertical rotating laser beam.

In such arrangements the laser beam is projected along the axis about which a platform supporting a prism rotates. An electric motor is used to drive the platform typically through a belt or gear cog arrangement. Thus, the known devices rotate fully about an axis defining a full plane. This means that there can be a significant delay at a remote sensing location for the beam to rotate between each transversing of the location. The speed of rotation may be variable but this can lead to a further problem. The effective angular velocity can be very high with the effect that the laser radiation flux experienced by a sensor may be too low to be reliably sensed. Thus increasing the speed of rotation can lead to unreliable sensing of the laser beam so requiring a slower speed of rotation, and slowing the speed of rotation increases the time between each transversing by the beam of the sensor. Electronic design of the sensor may accommodate some of these problems.

Further problems are exhibited by the known systems. The use of quality optical elements such as a prism leads to an expensive device. Further, the mechanical supporting structure also typically needs to be to a very high tolerance with the result again that the device is expensive.

To overcome some of these problems a number of devices have been proposed.

U.S. Pat. No. 5,287,365 to Nielsen et al describes a laser apparatus where a semiconductor laser is mounted onto a platform which is rotated by an electric motor. The platform has a central shaft which is driven by an electric motor through a belt drive. Electrical power is transferred to the shaft and thus to the laser through slip rings. Control of the electrical motor is limited to on/off and speed control.

As disclosed the apparatus provides essentially a horizontal plane in which the laser beam rotates.

In U.S. Pat. No. 4,973,158 to Marsh an instrument is disclosed which is intended to be fitted to a surveyor's transit and telescope. It is disclosed as rotating in a vertical plane aligned with the plane of view of a telescope. There is no disclosure of being able to change the plane of laser beam rotation in a convenient and simple manner. Rather the instrument is limited to improvements related to a transit level rather than a more general instrument.

The disclosed device utilises a rotatable shaft which has a platform at each end. A semiconductor laser is mounted on one platform with drive and control circuitry mounted on the other platform. To power the laser, electrical power is supplied to the platforms through electrical brushes to the shaft. The shaft and the platforms are rotated by an electric motor through gear cogs.

In U.S. Pat. No. 5,400,514 to Imbrie et al an apparatus is disclosed where a laser pointer is centrally supported on a shaft. The shaft is belt driven to rotate by an electric motor within a rectilinear body. The electrical and electronic circuitry for the electric motor and the laser pointer are completely separate. The laser pointer includes drive circuitry and battery for electrical power supply independent of the rest of the apparatus. Accordingly, the electrical motor must rotate the semiconductor laser and the necessary circuitry.

The body of the apparatus disclosed does include means to set up the apparatus so that the plane within which the laser radiation projects is either vertical or horizontal. For this purpose three orthogonally mounted spirit bubble levels are provided with two sets of adjustable feet projecting from adjacent sides. To change the plane within which the laser beam rotates the apparatus must be set up afresh.

It is a proposed object of this invention to provide an apparatus to obviate or minimise at least one of the aforementioned problems, or at least provide the public with a useful choice

SUMMARY OF THE INVENTION

The invention may be said to reside, not necessarily in the broadest or only form, in laser level apparatus including body means, platform means supported by the body means and selectively pivotable about a first axis, drive means supported by the platform means and selectively pivotable about a second axis transverse to the first axis, head means rotatably supported by the drive means and adapted to be selectively rotated by the drive means about a third axis transverse to the second axis, laser means supported by the head means to selectively project laser radiation from the head means transverse the third axis, laser means includes a semiconductor laser adapted to produce the laser radiation, and the apparatus includes a first rotatable electrical connection means and a second rotatable electrical connection means through which electrical power is supplied to the semiconductor laser.

In another preferred form, the drive means includes a motor with a rotatable shaft driven thereby which is coaxial with the second axis and the head means is supported by the shaft.

In one preferred form, wherein the shaft has two partly coaxial electrically conductive parts insulated one from the other, and the first rotatable electrical connection means and the second rotatable electrical connection means each includes a respective one of the parts. According to a preferred form, the first rotatable electrical connection means and the second electrical connection means respectively includes electrical brush arrangements. It will be appreciated that other arrangements known to the art similar in effect to the electrical brush arrangement can be used as desired.

The separation of the laser means and the electrical power source means the weight of the laser means can be reduced so easing the load experienced by the drive means during rotating the laser head. In one preferred form, the laser means may be rotated and varying and relatively high speeds and dithered within an arc. For such action it is desirable for the rotating laser means to have a relatively low inertia.

It will be appreciated that the ability to rotate the various parts of the apparatus with respect to other parts permits flexibility and ease of use.

In a preferred form, the laser radiation projected by the laser means is substantially perpendicular to the third axis, the third axis is substantially perpendicular to the second axis, the second axis is substantially perpendicular to the first axis, and the drive means may be selectively rotated to a first configuration where the third axis is substantially parallel or coaxial with the first axis and to a second configuration where the third axis is substantially perpendicular to the first axis.

In a further preferred form, the body means has levelling means to enable adjustment of the support of the platform means such that the first axis is within a vertical plane, and thereby when the apparatus is in the first configuration the laser radiation projected by the laser means is substantially within a horizontal plane and when the apparatus is in the second configuration the laser radiation projected by the laser means is substantially within a vertical plane. By levelling the body means so that the first axis is vertical the laser beam can be rotated in a horizontal or vertical plane. In the case of a vertical plane the platform means can be rotated about the first axis so permitting the vertical plane and a subsequent vertical plane to be at a known horizontal angle one with respect to the other. This can be used, for example, to set out two adjacent sides of a building.

According to one preferred form, the drive means may be selectively rotated and secured in a configuration between the first and second configurations. This permits the plane within which the laser beam rotates to be a sloping plane. This can be used, for example, to indicate a slope for earth moving machinery to work to as may be required for drainage control of a land site.

According to a preferred form, the apparatus is one including levelling means acting between the body means and the platform means. In a preferred form, the levelling means includes two spirit bubbles set transverse to each other and within or upon the platform means for indication of levelness of the platform means, and foot screws spaced about the platform means and acting against the body means with which to adjust the relative position of the platform means with respect to the body means and thereby with the spirit bubbles permit the levelling of the platform means. In an alternative preferred form, the levelling means includes two spirit bubbles set transverse to each other and within or upon the platform means for indication of levelness of the platform means, and the platform means includes a shaft projecting substantially perpendicular to a platform plate and substantially parallel to the first axis into the body means through a first hole and at substantially a distal end of the shaft, two spring means act to bias the shaft against the action of two radially spaced transverse acting screws with which the platform means may be levelled by tilting the shaft relative to the body means. In a further preferred alternative form, the levelling means includes semi-automated or automated means to effect levelling of the platform means.

In another preferred form, the apparatus is one including a stand for supporting the body means in an elevated position above a floor or ground surface. In a preferred form the body means is adapted to rest upon an suitable relatively flat surface. For example a table top or other surface which is reasonably flat and level to support the apparatus and permit levelling of the platform means relative to the body means.

In a preferred form, either the platform means includes a graduated circular scale and the body means includes an indicator mark or vice versa, therewith the rotation of the platform means about the first axis can be determined. By use of the scale an indication of rotation of the platform means with respect to the body means can be provided. In a preferred form, the graduated circular scale is selectively rotatable and securable thereby permitting the scale to be set to the indicator mark and the platform means rotated a desired quantity of rotation indicated by the scale. In this manner a vertical plane of laser beam rotation may be set a specific angle relative to a previous vertical plane of laser beam rotation. In a preferred form, the platform means or the body means as the case may be includes a ring upon which the indicator mark is, and the ring is selectively rotatable and securable thereby permitting the indicator mark to be rotated to a point closest to the graduated circular scale. Should the body means and the platform means be angled one to the other then the plane of the graduated scale and the ring will also be angled. Accordingly there will be a side where the ring and scale are closest and a side opposite where they are furthest. Thus to improve accuracy and ease of operation it is desirable to adjust the indicator mark to be as near as possible to the scale.

According to a preferred form, either the platform means includes a graduated scale and the drive means includes an inclination mark or vice versa, therewith the rotation of the drive means about the second axis can be determined and set thereto.

In another preferred form, the drive means includes an electric motor and control means to control the rotational position thereof. In a preferred form, the drive means includes an electric stepper motor and control means to control the rotational position thereof and the active state of the laser means. In preference, the control means is contained within the platform means and connected to the stepper motor and laser means via electrical wiring. Preferably, the control means permits control of the stepper motor such that it may be rotated to a desired rotational position, continually rotating about the third axis, or oscillating between two rotational positions. It will be appreciated that other forms of motors may be used as desired.

In a preferred form, the laser head includes means to collimate the laser with respect to the third axis. This permits adjustment so that the third axis is perpendicular to the plane within which the laser emits a rotating beam of radiation. In a preferred form, the laser head includes support means for supporting the laser within the laser head, the support means including a resilient first bearing means adapted to provide a firm hold of the laser, and a second bearing means including a resilient bearing surface against which and along a collimator axis substantially parallel to the third axis an adjustable means presses the laser. In this manner, the first bearing permits slight rotation of the laser in response to adjustment of the adjustable means which can be used to collimate the laser with respect to the third axis. A locking means to secure the laser in place after collimation can be incorporated as desired.

According to a preferred form, the apparatus is one including a remote control unit adapted to transmit control setting signals to a receiver within the control means thereby to effect control of the stepper motor and the laser means.

In a preferred form, there is provided an apparatus, substantially as herein described, and a detector staff with an array of detectors each for detection of the laser radiation. In preference, the array of detectors includes two sets of the detectors each set being aligned alone intersecting first and a second line such that the detectors form a cross. Other intersecting forms can be used as desired. In a preferred form, the laser radiation is emitted in a plane and the detector array is moved so that it is aligned with either the first or the second line and the control means is commanded to effect reduced dithering of the laser radiation within the plane until the laser radiation is emitted in a single direction, whereafter the detector array can be centered with respect to the laser radiation.

Without limiting the invention disclosed herein, one known system including a laser level instrument and a remote control is disclosed in PCT Patent Application WO 96/01978.

In one preferred form, the platform means and body means have aperture means such that the first axis is unobstructed and that the laser means may project laser radiation through the platform means and body means. Further, according to one form the drive means is supported by the platform means so as to be rotatable through 180° relative to the platform means. By this means the laser may be orientated to shine through the platform and body means and may be used as a plumb line. Also setting the apparatus above a style, levelling the apparatus and by then using the plumb line feature the apparatus may be accurately located relative to the style. Once so set up rotation of the platform means with respect to the body means does not change the first axis being within the plane of the laser radiation. This may facilitate marking out of lines such as for walls and fences.

BRIEF DESCRIPTION OF THE DRAWINGS

To assist in the understanding of the invention preferred embodiments will now be described with reference to the accompanying drawings.

DETAILED DESCRIPTION OF THE INVENTION

It will be appreciated that the accompanying drawings are not to engineering standard or are intended to be engineering construction drawings. Rather the drawings are schematic and somewhat symbolic. The intention is to illustrate the invention and the concepts associated therewith such that a skilled addressee can understand the invention and apply it as they desire. Accordingly, perspective and illustrated features may be distorted or omitted in the interest of facilitating understanding and convenience of drawing. Throughout the drawings the same numerical reference number will be used to refer to the same feature.

In broad terms the apparatus (1) includes body means (2). Supported by the body means and selectively pivotable about a first axis, as indicated by (3), are platform means (4). Supported by the platform means and selectively pivotable about a second axis, as indicated by (5), transverse to the first axis are drive means (6). Rotatably supported by the drive means and adapted to be selectively rotated by the drive means about a third axis, as indicated by (7), transverse to the second axis are head means (8). Supported by the head means are laser means (9) adapted to selectively project laser radiation from the head means transverse the third axis.

Figure 1:
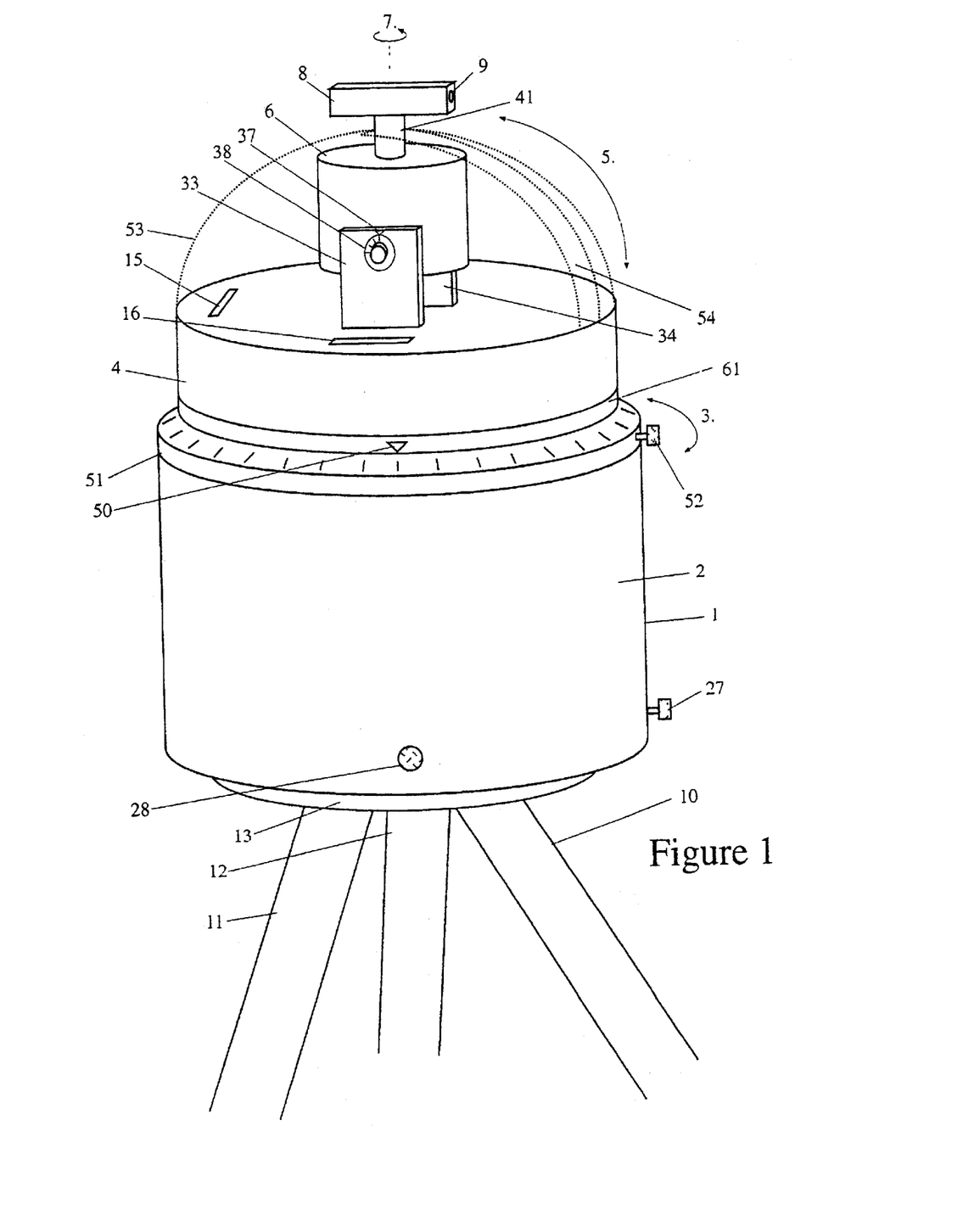
FIG. 1 is a sketch of the apparatus.
Figure 2:
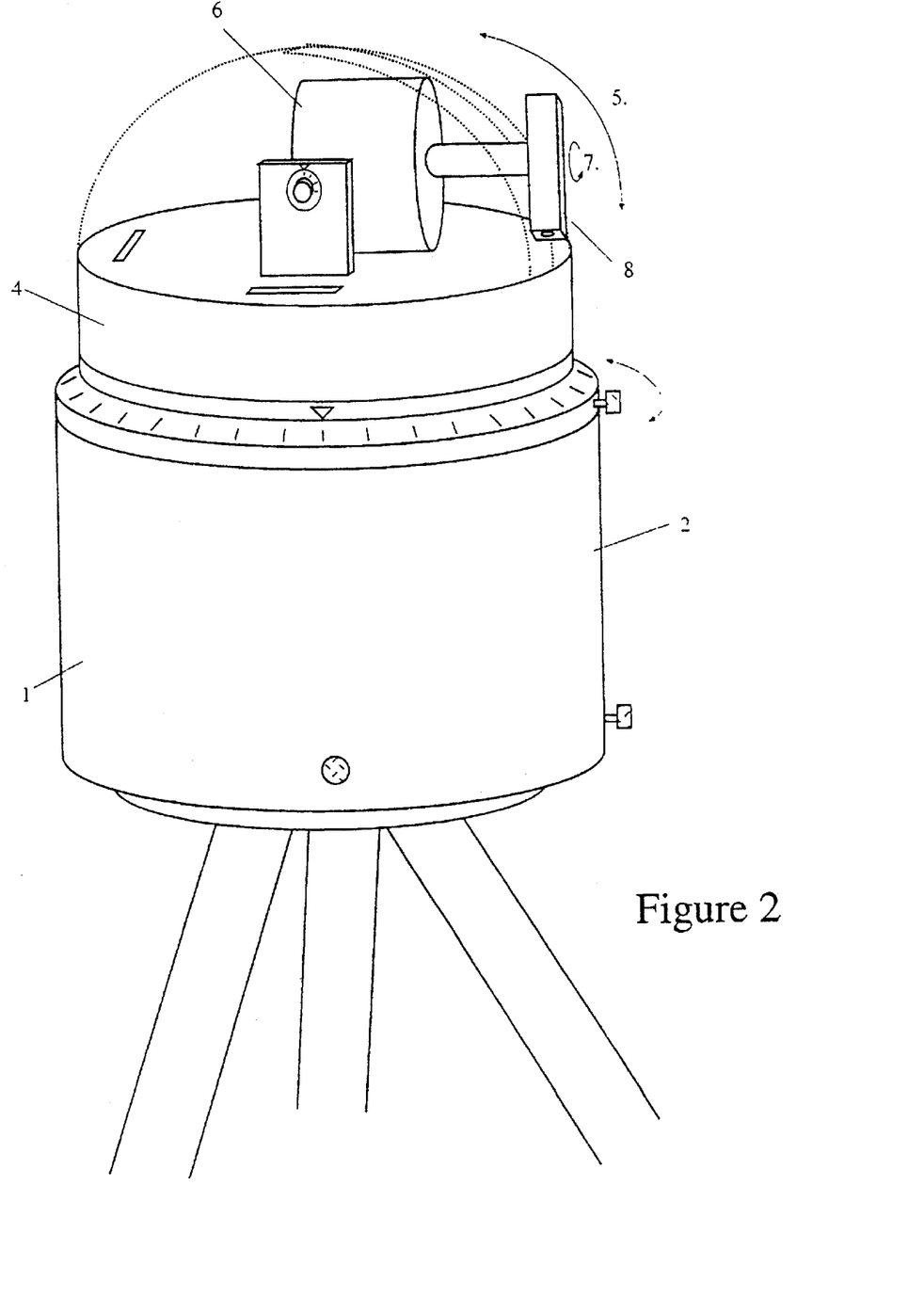
FIG. 2 is a sketch of the apparatus similar to FIG. 1 showing a different orientation of the drive means.

The construction of the apparatus is such that the laser radiation projected by the laser means is substantially perpendicular to the third axis, the third axis is substantially perpendicular to the second axis, the second axis is substantially perpendicular to the first axis, and the drive means may be selectively rotated to a first configuration where the third axis is substantially parallel or coaxial with the first axis and to a second configuration where the third axis is substantially perpendicular to the first axis. Comparison of FIGS. 1 and 2 illustrates the first and second configuration of the drive means and from this it will be seen that the apparatus permits easy conversion and set-up from a vertical plane to a horizontal plane in which the laser beam rotates. It will be appreciated that the first and second configurations whilst in this embodiment are extremes in other embodiments the drive means may be rotatable with respect to the platform means through a greater angle.

The body means may be mounted onto a tripod stand having legs (10, 11 and 12) and platform (13). The body means can be secured to the platform (13) with a suitable bolt co-acting with threaded hole (14). This permits the apparatus to be set up in an elevated and relatively stable position should this desired. The tripod and its use would be well known to a skilled addressee.

The body means is adapted to be supported by a suitable reasonably flat and sized surface. The body means has an annular rim (60) about the bottom of the body means with which the apparatus can be supported on such a suitable surface. Examples of suitable surfaces can include a table top and a fence post top. It will be appreciated that the apparatus should be supported in a stable fashion and the platform means levelled. If the surfaces is not reasonably flat then the levelling adjustment may be beyond that provided in the apparatus.

The platform means has two spirit bubbles (15 and 16) set within it and within a general disc like supporting plane (17) of the platform means. These spirit bubbles are set transverse one to the other so that the bubbles within each can be used to indicate levelness of the supporting plane. The supporting plane is the topmost portion of a coaxial platform plate (18) which forms the lower part of the platform means (4).

Figure 4:
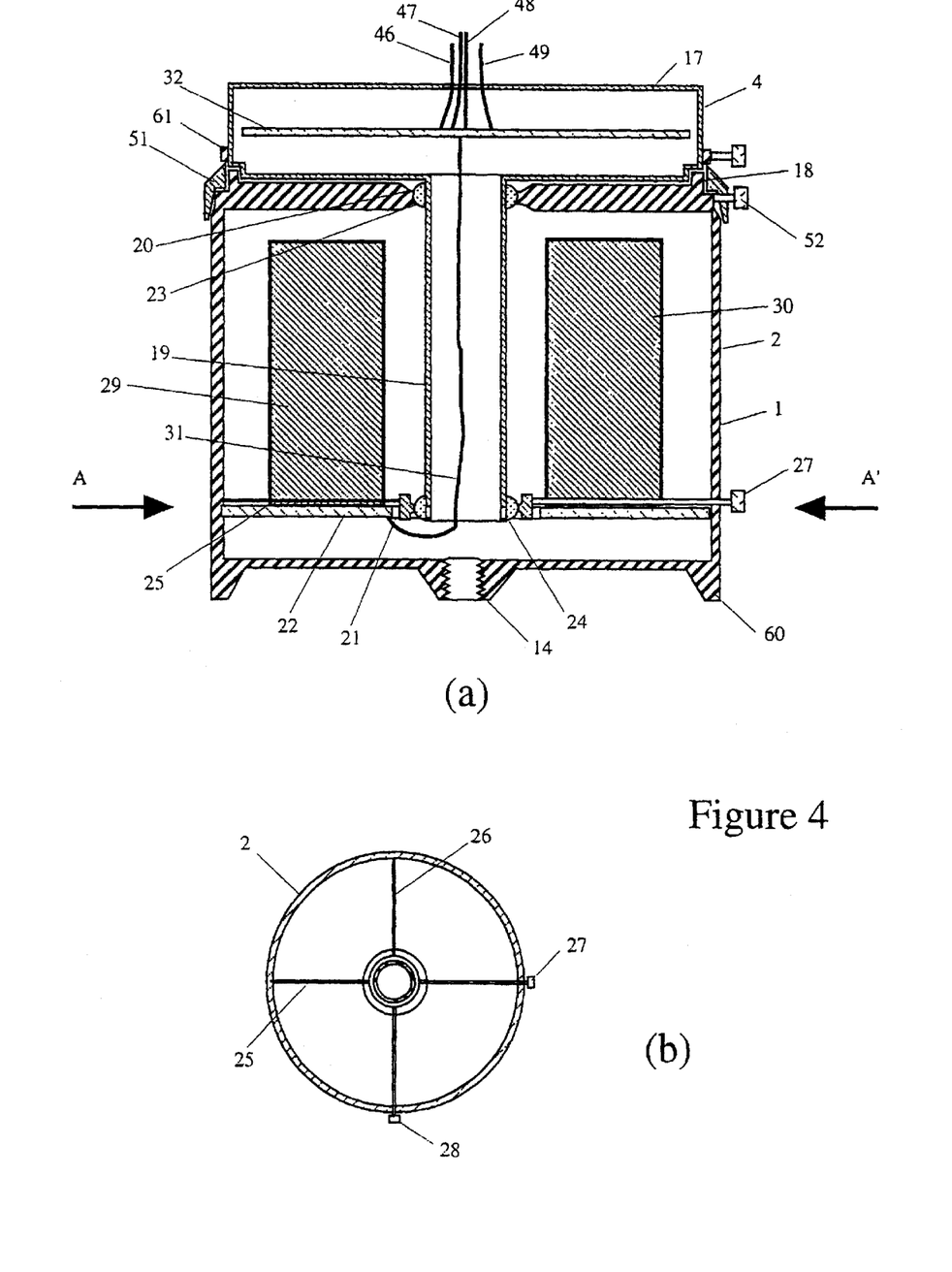
FIG. 4(a) is a cross sectional view of the body means illustrating the levelling means.
FIG. 4(b): is a cross sectional view along AA.

Centrally projecting from the platform plate and perpendicular thereto is a hollow shaft (19). The hollow shaft enters into the top of the body means through a suitable top aperture (20) and through a bottom aperture (21) within an internal web (22) of the body means. Supporting the hollow shaft is a top spherical bearing (23). This permits the shaft to a limited extent to be intentionally misaligned, tilted, with the axis of the top aperture. The bottom aperture is somewhat larger than the hollow shaft to permit selective misalignment of the hollow shaft with respect to a lower spherical bearing (24) held within a support means.

The support means includes two transverse compression springs (25 and 26) each acting against the influence of two transverse bolts (27 and 28). This arrangement biases the shaft towards the bolts and by adjustment of each bolt the shaft can be tilted with respect to the body means.

This permits the levelling of the platform means by tilting the shaft within a limited range. Once the apparatus is roughly levelled by adjusting the tripod or placement upon a suitable surface further levelling of the platform means (4) is effected by the selective tilting of the shaft.

Also within the body means are electrical batteries (29 and 30). These supply electrical power to the laser means and other circuitry and components. To transfer power from the batteries connectors to the batteries connect to terminals. These pass through the internal web (22) and are connected to electrical cable, such as a twin core flex (31). The electrical cable is passed through the shaft (19) to a control circuit board (32) within the platform means.

Rotation of the platform means can be limited by a suitable stop acting between it and the body means. This allows near 360° rotation of platform means, typically greater than 270°. with respect to the body means. Further, there is provided platform locking means, a bolt acting between the body means and the platform means, which can secure the platform means relative to the body means. This arrangement prevents the electrical cable becoming excessively twisted. The flexibility in the electrical cable permits a flexible electrical connection to be made between the batteries and the circuit board.

Projecting from the platform means are two spaced and essentially centrally positioned mounting arms (33 and 34). Between these arms is rotatably supported the drive means (6) on pivots (35 and 36) which align with the second axis. The pivots or at least one thereof includes drive locking means, such as a not acting on a threaded shaft, with which the relative position of the platform means and the drive means can be secured. Also provided is an inclination marker (37) on the arm (33) and a graduated scale (38) fixed to the pivot (35) such that rotation of the drive means effects rotation of the scale relative to the inclination marker.

By use of the scale, inclination marker and the drive locking means it is possible to set the plane within which the laser beam rotates. This is accurate enough for some practical applications but in others, where the angle of inclination is critical, more precise means of setting inclination can be used. The apparatus, including the laser drive means, could be adjusted so that the laser beam passes through a number of points determined using other methods and instruments.

In another form, the supporting plane can incorporate one or more graduated scale spirit bubbles. These could be 4% inclination full scale and are known to the art. There could be two which are transverse one to the other and thereby the platform means may be adjusted to a desired inclination. Accordingly, the plane of the laser beam is also adjusted to that inclination or to a plane relative thereto. In another form, a single graduated scale spirit bubble is provided.

Figure 3:
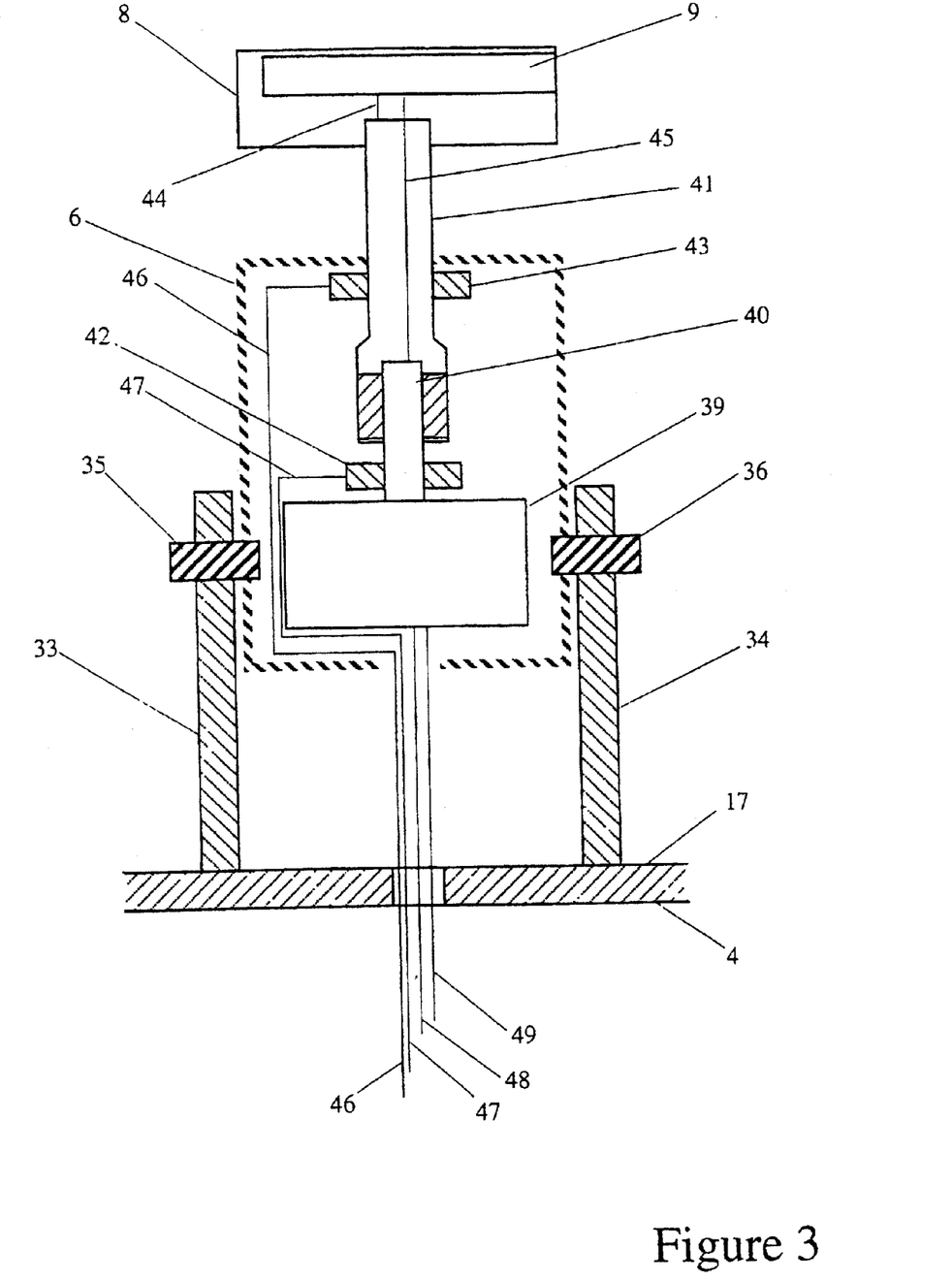
FIG. 3 is a cross sectional view of drive means illustrating the electrical arrangement and the mounting arrangement.

Within the drive means is mounted an electric stepper motor (39). In this embodiment a stepper motor is used but it will be appreciated that other motors may be used as desired. For example, a D.C. chopper motor could be used where the rotor of the motor includes a vane which interrupts a light beam of a photodiode and photo-transistor arrangement and upon interruption the polarity of the D.C. voltage to the motor is reversed thereby effecting a reversal in rotation direction.

To the metal motor shaft (40) of the stepper motor is fitted a further metal outer shaft (41) insulated from the motor shaft. By use of electrical brushes (42) positive potential electrical power is passed to the motor shaft. Through a further set of electrical brushes (43) negative electrical power is passed to the outer shaft.

The outer shaft passes out of the drive means. Mounted to the outer shaft is the head means (8) within which is mounted the laser means (9), a low power semiconductor laser. This device requires low voltage D.C. electrical power. This can be supplied through electrical cables (44, 45, 46 and 47) and the electrical brushes from the control circuit board. The control circuit board includes drive circuitry to control the laser means and is powered from the batteries through cable (31) already discussed. The control circuit board also includes drive and control circuitry for the stepper motor and electrical connection from the control circuit board to the stepper motor is through cables (48 and 49); that is, as will be appreciated by a skilled addressee, four control and power lines for the stepper motor.

To facilitate changing vertical planes within which the laser beam rotates the platform means has an indicator or rotation marker (50) upon a ring (61) coaxially rotatable about the platform means, a rotatable graduated scale (51) and locking mechanism (52). Once the locking mechanism, a bolt acting against the platform plate (18), is unlocked the scale (51) is freely rotatable about the platform means but not axially moveable. Likewise the ring and rotation marker are securable and rotatable to and about the platform means. Initially the rotation marker is rotated until it is proximal to the smallest gap between the graduated scale on the body and the ring on the platform means. It is then secured in place.

To change from one vertical plane to another at a predetermined angle to the first the scale is rotated and zeroed to the rotation marker. Then the scale is secured with the locking mechanism. Next the platform means is rotated, with respect to the body means, by the desired angle as indicated by the scale and rotation marker thereby effecting the translation of the plane of rotation of the laser beam to a new desired plane. The above is applicable, for examples, to marking out foundations for buildings and property boundary fences.

To protect the apparatus the drive means and upper portion of platform means are covered by a removable dome (53). In the figures it is illustrate as being transparent to permit easy checking of inclination of the plane within which the laser beam rotates but this is a matter of choice. The dome has a slot (54) though which the outer shaft (41) projects thereby supporting the laser head (8) outside of the dome. The slot permits variation of the inclination of the laser head and the rotation thereof about the second axis.

Switches for control of the apparatus through their effect on the control circuit board are mounted in the platform means to be accessible externally thereto. These are not shown but take a form known to the art. Wire cabling connects the switches to the control circuit board.

Further, the control circuit board and platform means also incorporates a receiver means. This, with a remote control device capable of transmitting signals adapted to be detected by the receiver means, permits remote control of the apparatus. Again, the details of this do not form part of the invention and take forms generally known to the art. In a preferred form the remote control use a low power radio link to transmit commands to the receiver means.

The control circuit board contains a circuit, the details of which do not form part of the invention and take forms generally known to the art. The circuit includes a micro controller (62) and suitable circuitry. See FIG. 6 but note that the details of the receiver means are not illustrated but take prior known forms. The micro controller runs software stored in an internal EPROM which permits a number of functions to be achieved dependant upon a user's control of the switches via connections (63) or via a serial link (64) from the receiver. The micro controller can effect operation and control of the laser means, the speed with which the laser is rotated by the stepper motor, and the direction of rotation.

Figure 6:
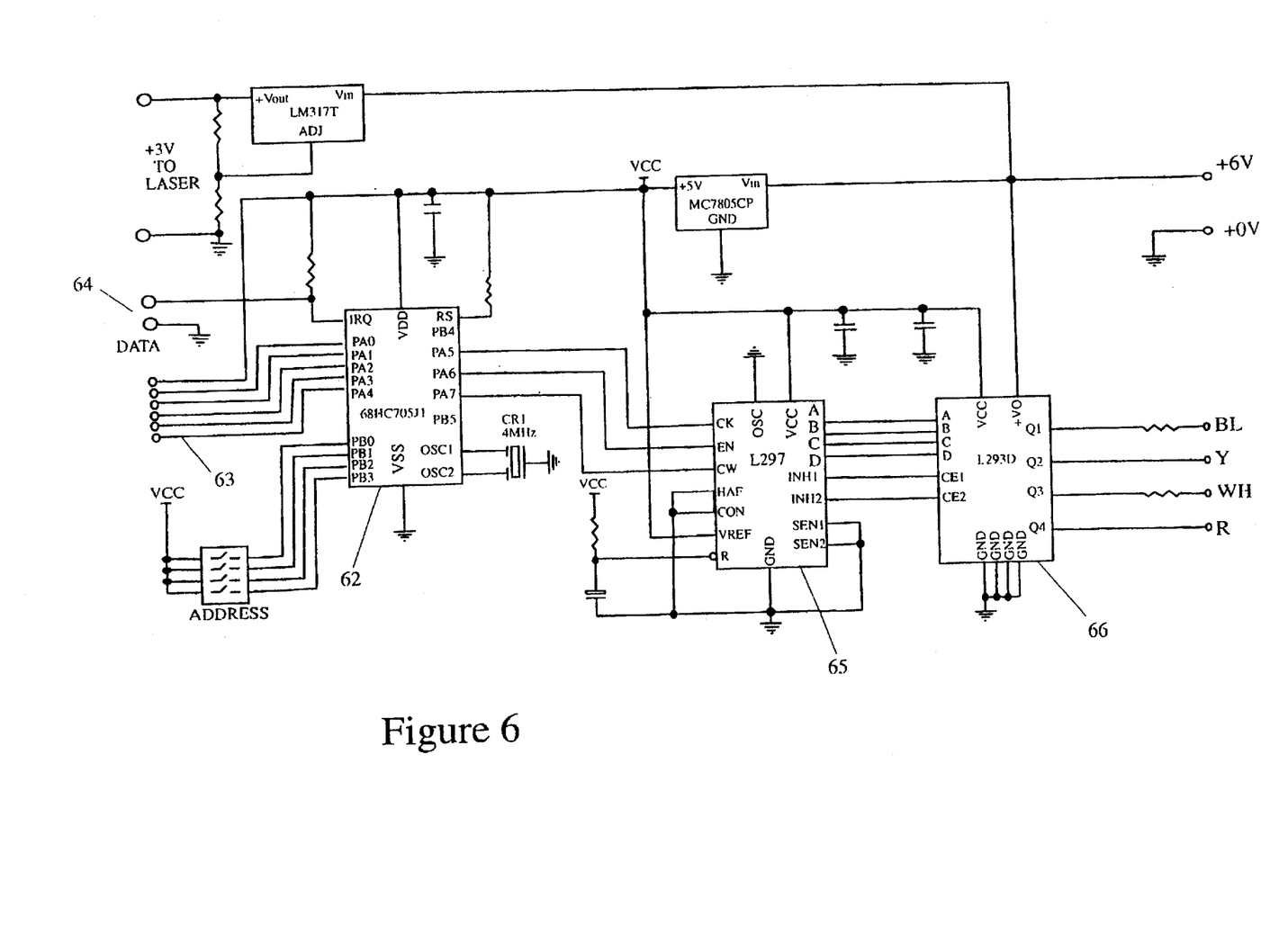
FIG. 6 is a schematic sketch of the electronic circuitry controlling the motor.

The micro controller generates control signals which motor control integrated circuit (65) uses to control driver integrated circuit (66). The micro controller generates a series of pulses on line (EN) with 400 pulses equates to a full rotation of the stepper motor. The frequency of the pulses is between 200 Hz and 3000 Hz in 200 Hz steps. This provides a laser rotation speed of 30 rpm to 450 rpm.

The micro controller also generates a rotation direction signal on line (CW) to control the direction of rotation of the motor.

For correct operation of the stepper motor the maximum start up the pulse frequency is limited to 1600 Hz and the micro controller will default to this should the speed of the last rotation have required a greater frequency than this. Likewise the speed is controlled when the direction of rotation is altered. For similar reasons the maximum dither speed is limited to a pulse frequency of 800 Hz.

The dither is controlled by the micro controller to occur about the direction just prior to the micro controller receiving a request for dither mode. The minimum range is ±10 pulses with a maximum range of ±100 which corresponds to 18° to 180° dither range. Whilst in the dither mode the frequency of rotation can be increased up to the maximum above and the width of the dither can be varied. Also the centre line of the dither can be rotated clockwise or counter clockwise as desired.

It will be appreciated that the minimum and maximum values have been selected for the particular embodiment and are a matter of choice in view of the embodiment.

Further the rotational position of the laser beam within the plane can be set so that the laser projects along a certain line by control of the stepper motor. Also the stepper motor can be controlled to dither between two selected extremes so that the laser beam effectively oscillates between two extremes such a ±10° from a central line under the control of a user.

Figure 5:
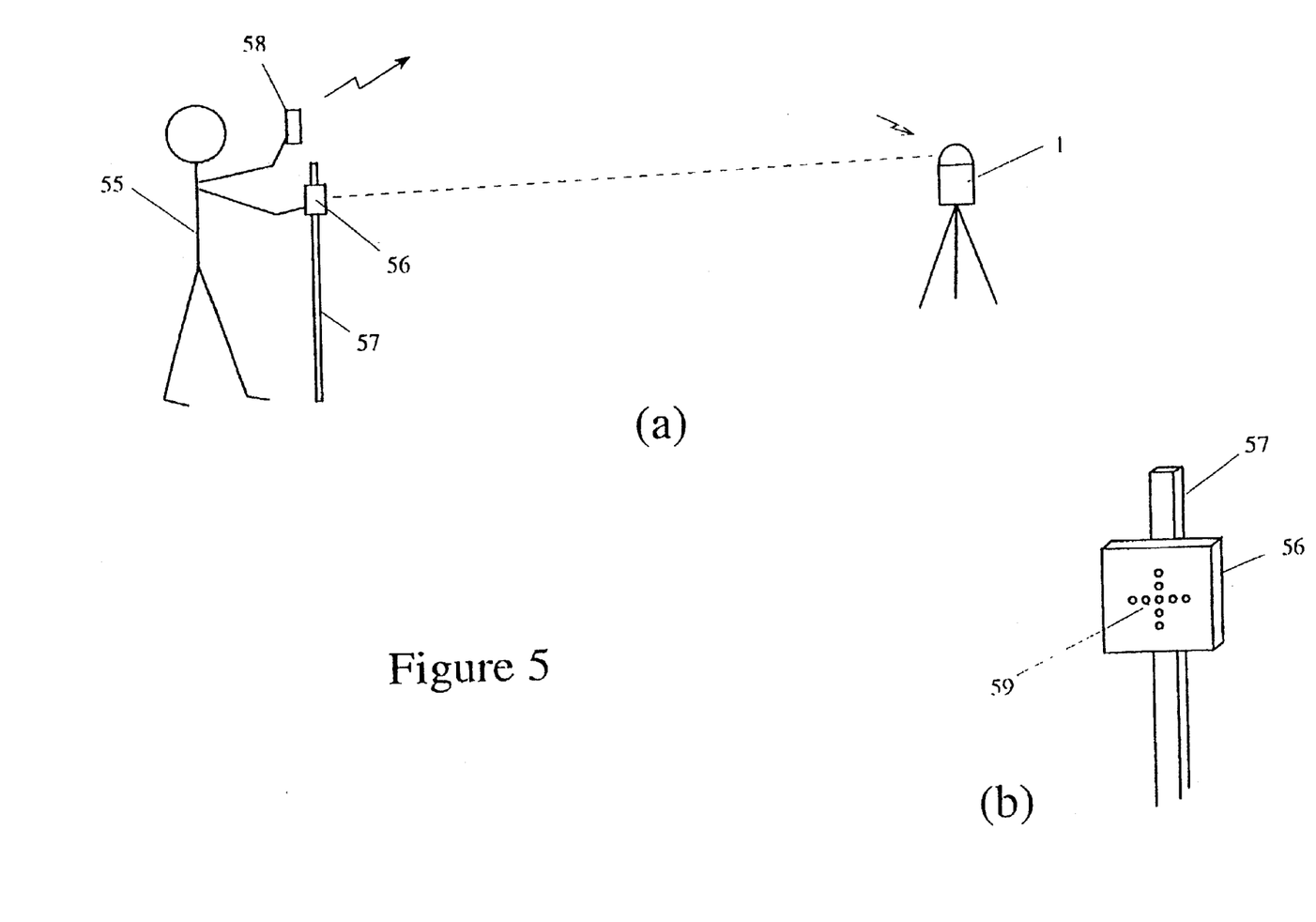
FIG. 5(a) is a sketch of a manner in which the apparatus can be used with a remote control device.
FIG. 5(b) is a sketch of the detector staff.

As is known to the art, in high ambient light levels the laser beam can be difficult to see. It is known to use a device including a detector adapted to detect the laser beam and provide either or both an audio or visual indication when the laser beam is detected. The apparatus disclosed herein with a remote control permits easy and simple control of the laser from a distance. For this a detector staff is used which has nine laser beam detectors aligned in two substantially orthogonal intersecting sets as illustrated in FIG. 5(b).

The user (55) can set up the apparatus to provide a horizontal beam but dithering about a desired direction and between a limited range covering the general vicinity where a position mark is required. Then the user can walk away to the general vicinity where a position mark is required. By adjusting the height of the detector array (56) along a staff (57) so that the horizontal detectors are transversed by the laser beam the user can determine the desired level. Then using the remote control (58) the user can command the apparatus to reduce the dither move the staff so that the detector array detects the laser beam. By repeating the process of reducing the dither and following the laser beam until there is no dither but a spot then a desired line and level can be located and marked out. It will be appreciated that when the central detector (59) is detecting the laser beam projected along a desired line then the level and direction of the position is indicated.

Figure 7:
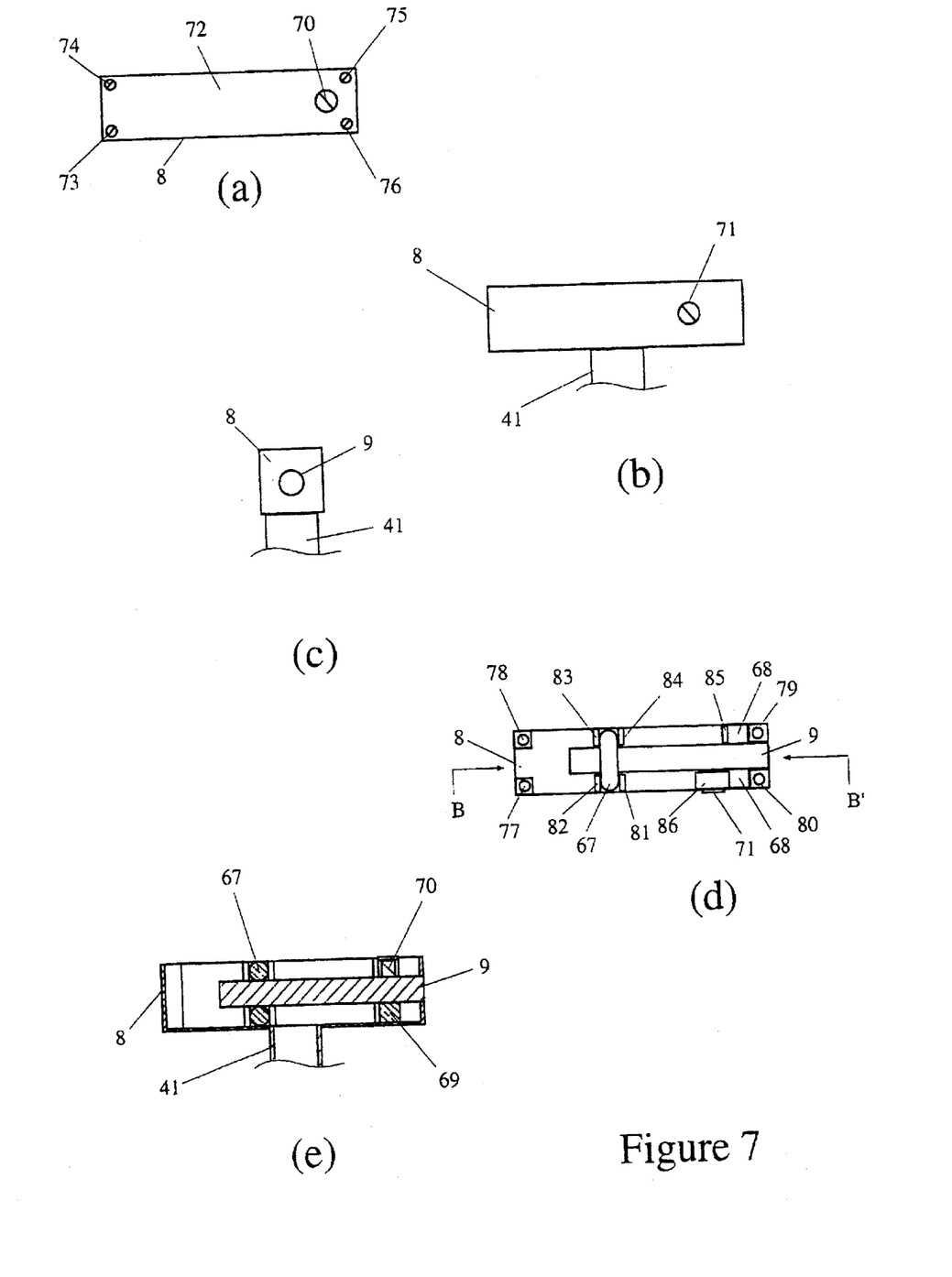
FIG. 7 is a schematic sketch of a preferred means for enabling collimation of the laser.

The laser (9) is substantially cylindrical in shape. It is mounted to the laser head (8) through an elastomer bearing at each end. In FIG. 7 this is illustrated in schematic form with other features, such as electrical wiring omitted for clarity. FIG. 7(a) is a plan view. FIG. 7(b) is a side view, FIG. 7(c) is an end view looking into the laser. FIG. 7(d) is a plan view with the lid removed, and FIG. 7(e) is a cross sectional view along BB'.

The laser head is box like mounted on shaft (41) and has a lid (72) secured by screws (73, 74, 75 and 76). These screws screw into threaded holes (77, 78, 79 and 80).

At one end of the laser the bearing takes the form of an "O" ring (67) supported and retained between wall members (81, 82, 83, 84) of the laser head. The bearing at the other end includes a "U" shaped elastomer block (68) supported and retained by member (85) and portion (86) of the laser head. In this manner the bearings are held within channels. The "O" ring is compressed by the lid to firmly hold the laser.

The laser is held between the legs of the "U" shape and is biased upwards by the flat portion of the "U" shape (69). A threaded screw (70) co-acting with a threaded hole in the lid presses the laser against the flat portion of the "U" shape and a second screw (71), co-acting with a threaded hole within portion (86), transverse to the first is used to lock the laser in place. By loosening the locking screw and adjusting the first the laser can be tilted relative to the laser head. In this manner the laser can be collimated so as to rotate within a plane perpendicular to the third axis. Once collimation is achieved the locking screw is used to secure the laser in place.

The second embodiment illustrated in FIGS. 8, 9, 10 and 11 is a modification of the first embodiment. In the interest of brevity parts previously discussed with respect to the first embodiment will not be discussed again in respect of the second embodiment except if required to illustrate a difference. It will be appreciated that apart from the following discussion the second embodiment is the same as the first. In this embodiment dome (53) is omitted though a suitable protective housing could be provided.

Figure 8:
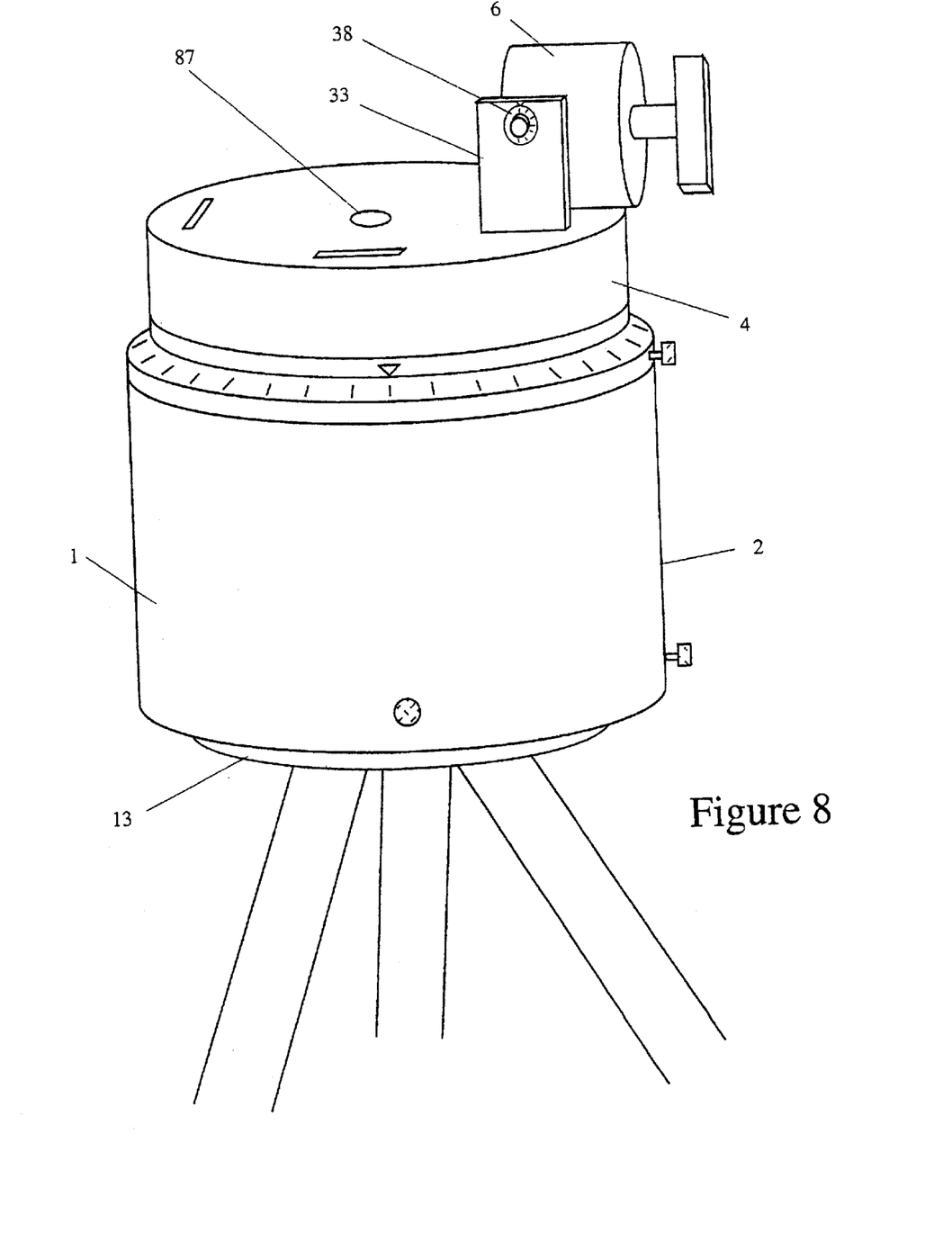
FIG. 8 is a sketch of a second embodiment with the laser head in one configuration.
Figure 9:
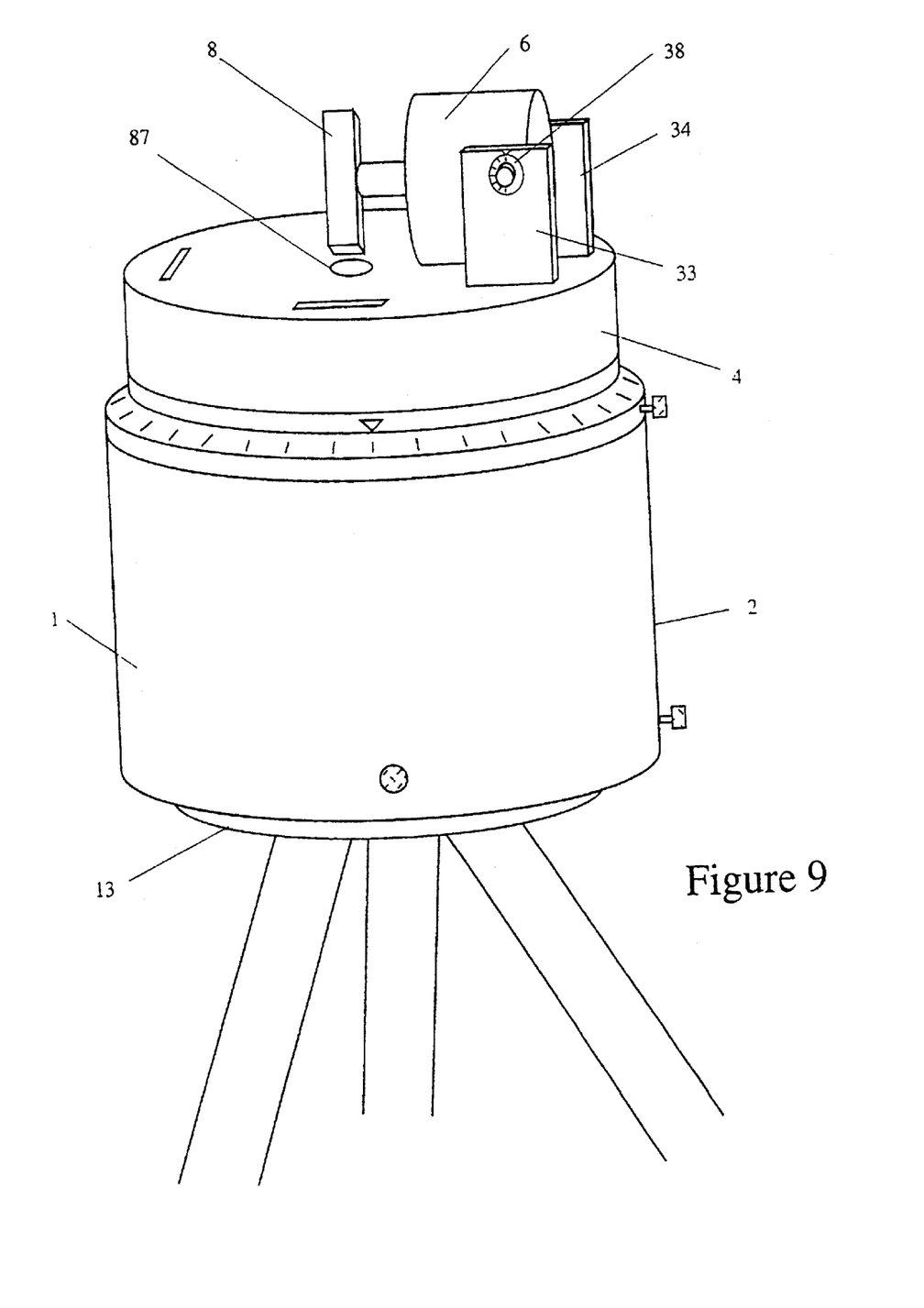
FIG. 9 is a sketch of the second embodiment with the laser head in another configuration.
Figure 10:
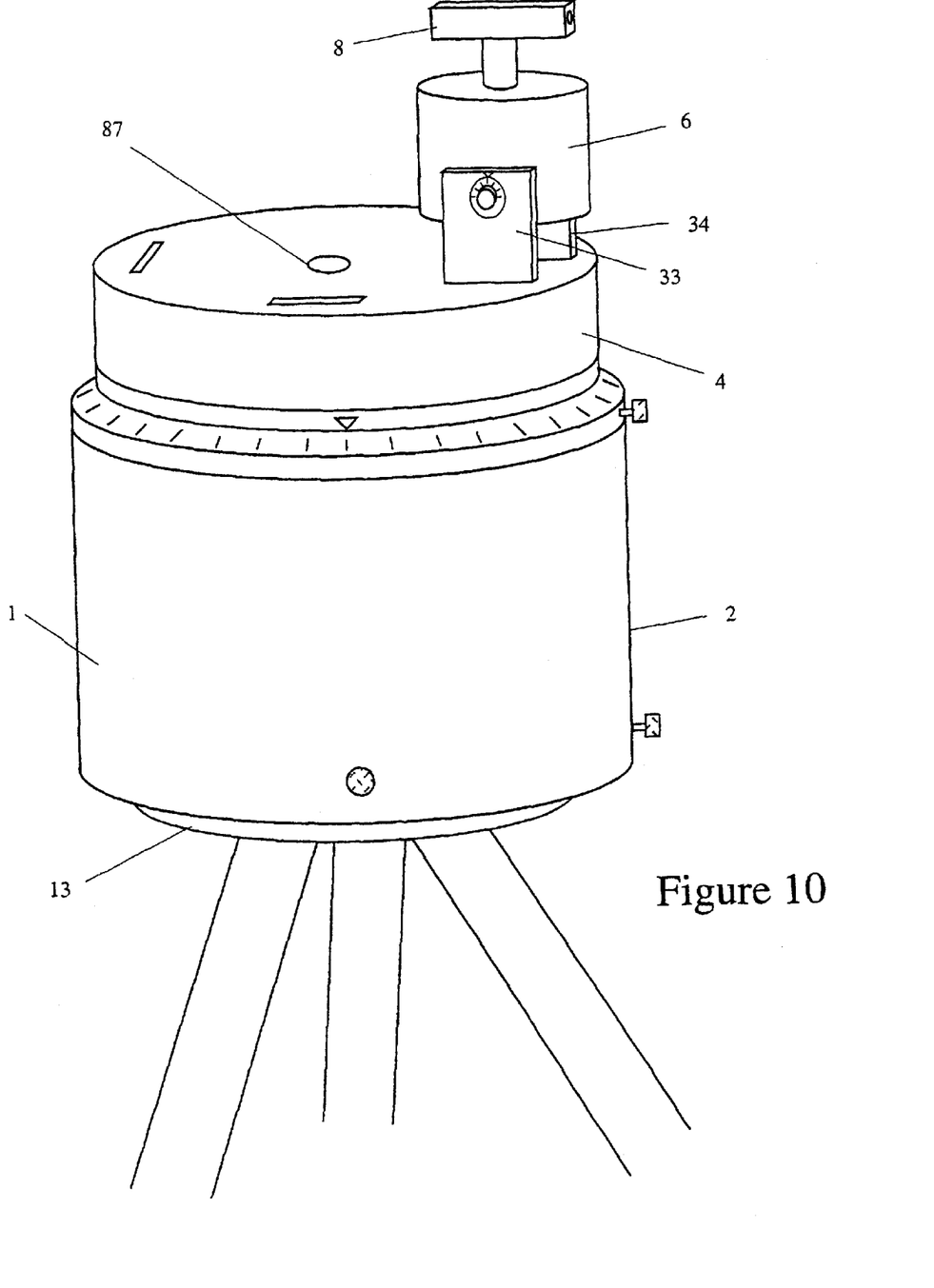
FIG. 10 is a sketch of the second embodiment with the laser head in yet another configuration; and, FIG. 11 is a sketch of a cross section view of the second embodiment.

The mounting arms (33 and 34) support the drive means (6) such that the drive means may be rotated between three configurations illustrated in FIGS. 8, 9 and 10. The drive means may be secured in any position between the two extremes depicted in FIGS. 8 and 9. It will be noted that the scale (38) is extended to ±180° with 0° corresponding to the laser irradiating a plain parallel to the top of the platform means.

The mounting arms are offset from the centre of the top of the platform means such that the laser means (9) may irradiate in a plane coincident with the first axis. The platform means and body means have aperture means, one shown as (87) and better seen in FIG. 11 such that the first axis is unobstructed. There are corresponding apertures in the body means (2) and circuit board (32). Further, the body means is fastened to the platform (13) and tripod by means of a bolt (88) with a coaxial central hole (89) therethrough screwing into threaded central hole (14).

This arrangement allows the laser to irradiate through the apparatus and stand so as to give a plumb line should the platform means be level. Further, this plumb line can be used to accurately align the apparatus over a style marking a specific reference point on a work site. Since the laser irradiation in the configuration shown in FIG. 9 is a plane coincident with the first axis rotation of the platform means does not change the relative position of the spatial position of the laser head. Compare FIG. 9 with FIG. 2 and it will be appreciated that the plane of irradiation is offset from the first axis and rotation of the platform means circumscribes as circle about the first axis. This feature facilitates ease of marking out construction sites.

Figure 11:
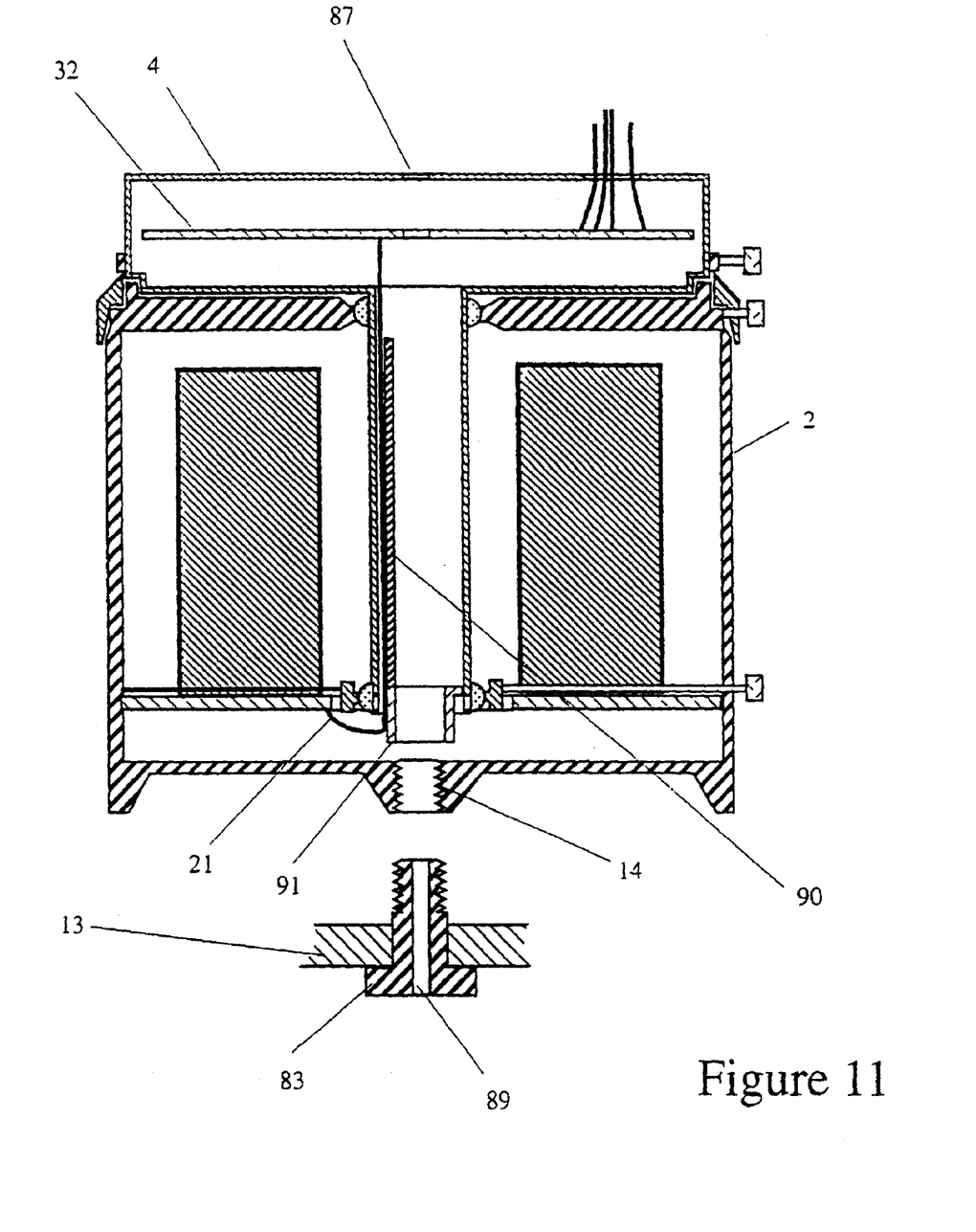

To minimise obstruction of the laser light shinning from the apparatus the wires (21) from the batteries are passed through a conduit (90). A ring (91) is provided at the lower end of shaft (19). It will be recalled that the platform means can rotate with respect to the body means by somewhat less than 360° in any one direction. The connection for the wires (21) on the circuit board and the batteries are aligned so that substantially equal rotation in each direction of the platform means relative to the body means may be accommodated.

It will be appreciated that the detector or sensor (56) is independent of and movable with respect to the body means. Further, being two orthogonal intersecting arrays of laser beam detectors adapted to detect the laser radiation and indicate which beam detectors are being irradiate it thereby indicates whether the sensor is above, below, left or right of the plane or line of the laser radiation. In this fashion, particularly with the second embodiment, a line may be determined at a desired relative orientation to the laser level to another remote point. Such a line could be level with the laser level and at a desired relative rotation, or it can be at a tilted angle.

Figure 12:
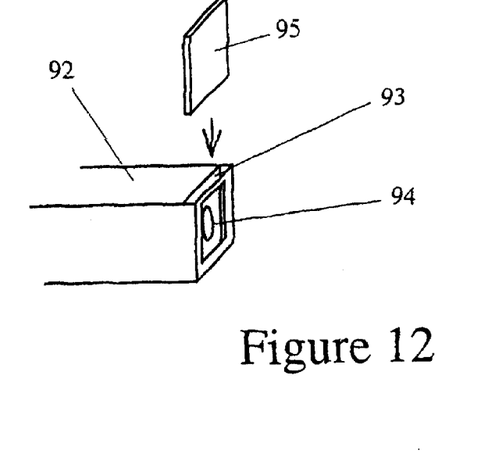
FIG. 12 is a sketch of the third embodiment with the laser head in yet another configuration.
Figure 13:
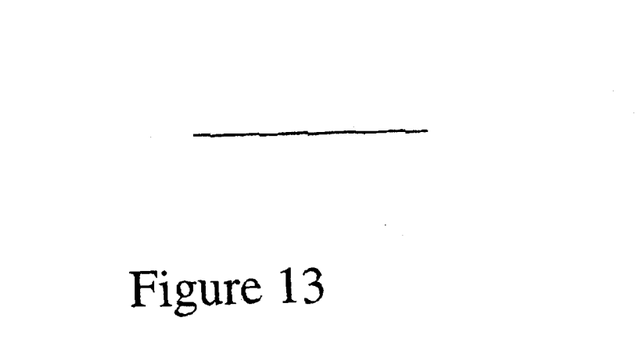
FIG. 13 is a spread of the spot beam of the laser such as a line.
Figure 14:
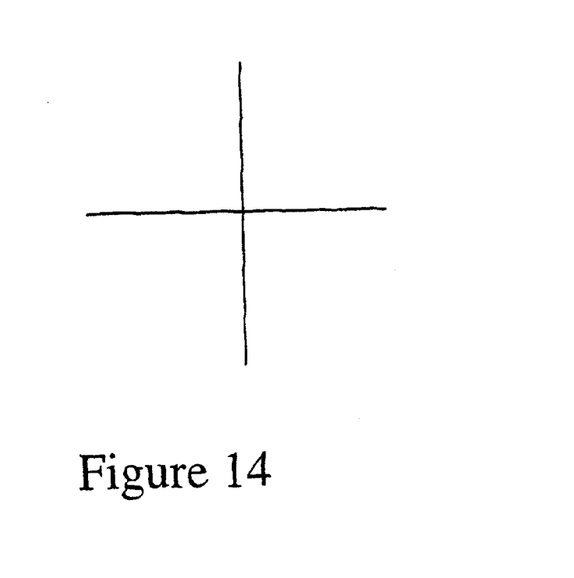
FIG. 14 is a spread of the spot beam of the laser such as two intersecting orthogonal lines.

A third embodiment differs from the previously mentioned two embodiments in the following manner with reference to FIGS. 12, 13 and 14. The head means (92) is the same as previously mentioned excepting that it includes a slot (93) in front of the laser emission window (94). Into this slot a prism (95) may be inserted. The prism may be manufactured according to known techniques such as etching to spread the spot beam of the laser into other shapes such as a line illustrated in FIG. 13 or two intersecting orthogonal lines illustrated in FIG. 14. The divergence caused by the prism is a matter of constructional choice. Whilst the use of a slot and a separate prism is illustrated here it will be appreciated that a combination prism with an unaltering portion, a single horizontal line generating portion, a single vertical line generating portion and a crossed vertical and horizontal lines. The prism can be slidable in a housing in front of the laser emission window The third embodiment finds application in marking out of internal fitments to a building. In such applications the laser beam intensity is great enough to be seen and the distance between laser level and marking position not great therefor any divergence in the laser beam need not be too great to be unacceptable to the application. For example, in setting out the frame of a cupboard and bench top the two intersecting orthogonal lines may be used to indicate a corner of the frame.

It will be appreciated that this disclosure is not intended to limit the invention to the preferred embodiment or details thereof. It is intended to give an overview of the invention as conceived and other embodiments will be apparent to the skilled addressee all of which fall within the spirit of the invention.

What is claimed is:

1. A laser level apparatus including:

body means, platform means supported by the body means and selectively pivotable about a first axis, drive means supported in the platform means and selectively pivotable about a second axis transverse to the first axis, the drive means including an electric motor a rotor of which is coaxial with a third axis transverse to the second axis, the rotor having two axial electrical conductors insulated one from the other, and a first rotatable electrical connection means and a second rotatable electrical connection means each electrically connected with a respective one of the two axial electrical conductors.

head means supported on a rotatable shaft coaxial with and connected to the rotor, the head means being adapted to be selectively rotated by the drive means about the third axis, laser means supported within the head means to selectively project laser radiation from the head means transverse the third axis, the laser means includes a semiconductor laser electrically connected to the two axial electrical conductors and adapted to produce the laser radiation, and electrical power source and control means connected to the first and second rotatable electrical connectors to selectively supply electrical power to the semiconductor laser and the electric motor.

2. A laser level apparatus as in claim 1 wherein the laser radiation projected by the laser means is perpendicular to the third axis, the third axis is perpendicular to the second axis, the second axis is perpendicular to the first axis, and the drive means may be selectively rotated to a first configuration where the third axis is substantially parallel or coaxial with the first axis and to a second configuration where the third axis is substantially perpendicular to the first axis.

3. A laser level apparatus as in claim 2 wherein the body means has leveling means to enable adjustment of the support of the platform means such that the first axis is within a vertical plane, and thereby when the apparatus is in the first configuration the laser radiation projected by the laser means is within a horizontal plane and when the apparatus is in the second configuration the laser radiation projected by the laser means is within a vertical plane.

4. A laser level apparatus as in claim 2 wherein the drive means may be selectively rotated and secured in a configuration between the first and second configurations.

5. A laser level apparatus as in claim 1 wherein the first rotatable electrical connection means and the second electrical connection means respectively includes electrical brush arrangements.

6. A laser level apparatus as in claim 3 wherein the leveling means includes two spirit bubbles set transverse to each other and within or upon the platform means for indication of levelness of the platform means, and foot screws spaced about the platform means and acting against the body means with which to adjust the relative position of the platform means with respect to the body means and thereby with the spirit bubbles permit the leveling of the platform means.

7. A laser level apparatus as in claim 3 wherein the leveling means includes two spirit bubbles set transverse to each other and within or upon the platform means for indication of levelness of the platform means, and the platform means includes a shaft projecting substantially perpendicular to a platform plate and substantially parallel to the first axis into the body means through a first hole and two spring means acting at substantially a distal end of the shaft to bias the shaft against the action of two radially spaced transverse acting screws with which the platform means may be leveled by tilting the shaft relative to the body means.

8. A laser level apparatus as in claim 3 wherein the leveling means includes semi-automated or automated means to effect leveling of the platform means.

9. A laser level apparatus as in claim 1 including a stand for supporting the body means in an elevated position above a floor or ground surface.

10. A laser level apparatus as in claim 1 wherein either the platform means includes a graduated circular scale and the body means includes an indicator mark or vice versa, therewith the rotation of the platform means about the first axis can be determined.

11. A laser level apparatus as in claim 10 wherein the graduated circular scale is selectively rotatable and securable thereby permitting the scale to be set to the indicator mark and the platform means rotated a desired quantity of rotation indicated by the scale.

12. A laser level apparatus as in claim 11 wherein the platform means or the body means as the case may be includes a ring upon which the indicator mark is, and the ring is selectively rotatable and securable thereby permitting the indicator mark to be rotated to a point closest to the graduated circular scale.

13. A laser level apparatus as in claim 1 wherein either the platform means includes a graduated scale and the drive means includes an inclination mark or vice versa, therewith the rotation of the drive means about the second axis can be determined and set thereto.

14. A laser level apparatus as claim 1 wherein the control means controls the rotational position of the electric motor and the active state of the laser means.

15. A laser level apparatus as in claim 1 wherein the control means is contained within the platform means and connected to the electric motor and laser means via electrical wiring.

16. A laser level apparatus as in claim 1 wherein the laser head includes means to collimate the laser with respect to the third axis.

17. A laser level apparatus as in claim 1 wherein the laser head includes support means for supporting the laser within the laser head, the support means including a resilient first bearing means adapted to provide a firm hold of the laser, and a second bearing means including a resilient bearing surface spaced apart from the first bearing means against which an adjustable means presses the laser to provide collimating adjustment.

18. A laser level apparatus as in as in claim 1 wherein the apparatus is one including a remote control unit adapted to transmit control setting signals to a receiver within the control means thereby to effect control of the electric motor and the laser means.

19. A laser level apparatus as in claim 1 wherein the drive means is supported by the platform means such that the laser head may be rotated so that the laser means lies within a plane within which the first axis lies.

20. A laser level apparatus as in claim 19 wherein the platform means and body means have aperture means such that the first axis is unobstructed and that the laser means may project laser radiation through the platform means and body means.

21. A laser level apparatus as in claim 1 wherein the drive means is supported by the platform means so as to be rotatable through 180° relative to the platform means.

22. A laser level apparatus as in claim 1 including a sensor of the laser radiation which is independent of and moveable with respect to the body means, the detector including two orthogonal intersecting arrays of laser beam detectors adapted to detect the laser radiation and indicate which beam detectors are being irradiate and thereby the sensor indicates whether the sensor is above, below, left or right of the plane or line of the laser radiation.

23. A laser level apparatus as in claim 1 including a prism mountable in front of the laser adapted to spread the laser beam into a line.

24. A laser level apparatus as in claim 23 wherein the prism is adapted to spread the laser beam into two intersecting orthogonal lines.

25. A laser level apparatus as in claim 1 wherein the electric motor is a stepper motor.

26. A laser level apparatus as in claim 1 wherein the electric motor is a D.C. chopper motor.

27. A laser level apparatus as in either claim 25 or 26 wherein the control means permits control of the electric motor such that it may be rotated to a desired rotational position, oscillated between two rotational positions, or continually rotate about the third axis.

* * * * *